Aug. 8, 1944. W. A. DUFFIELD 2,355,427

FIVE-SPEED TRANSMISSION

Filed March 24, 1943

INVENTOR.
WILLIAM A. DUFFIELD,
BY Hood & Hahn
ATTORNEYS.

Patented Aug. 8, 1944

2,355,427

UNITED STATES PATENT OFFICE 2,355,427

FIVE-SPEED TRANSMISSION

William A. Duffield, Windsor, Ontario, Canada, assignor to Windfields, Limited, Montreal, Quebec, Canada, a corporation of Canada Application March 24, 1943, Serial No. 480,270

8 Claims. (Cl. 74—189.5)

The object of my invention is to provide a speed varying transmission having a capacity of five forward speeds and a reverse.

The accompanying drawing illustrates my invention.

Figure 1:
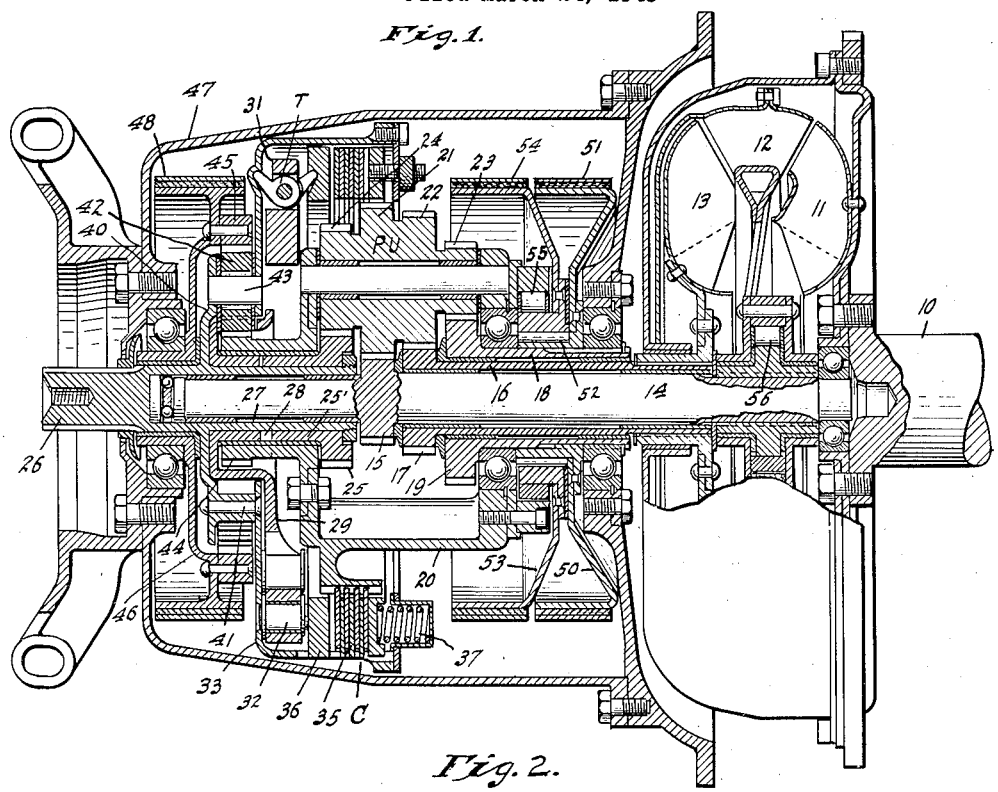
Fig. 1 is an axial section of an embodiment of my invention.
Figure 2:
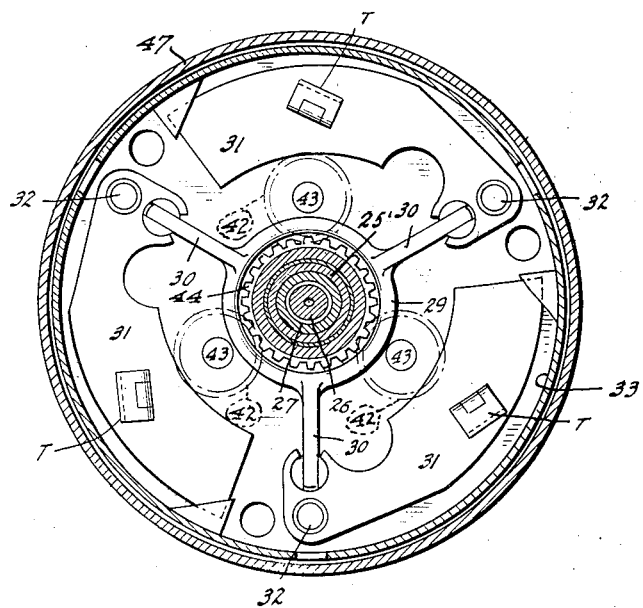
Fig. 2 is a section showing parts of the torque-responsive clutch.

In the drawing 10 indicates an input shaft carrying the impeller element 11 of a fluid coupling which comprises a first runner 12 and a second runner 13 arranged in series so that the torroidal flow of the fluid therein is in series from the impeller through the first runner, thence through the second runner, and back to the impeller.

Coaxial with the input shaft 10 is a shaft 14 carrying a sun gear 15. Sleeved over shaft 14 is a sleeve shaft 16 carrying a sun gear 17 adjacent gear 15. Sleeved over sleeve shaft 16 is a sleeve shaft 18 carrying a sun gear 19 adjacent gear 17. Coaxial with shaft 14 and enclosing gears 15, 17 and 19 is a gear carrier 20 within which is journalled a planetary gear unit PU comprising a gear 21 meshing with gear 15, a gear 22 meshing with gear 17, a gear 23 meshing with gear 19, and a gear 24 meshing with an output gear 25 journalled in pocket 27 in the inner end of the output shaft 26. Gear 25 is provided with a sleeve hub 25' which is rotatively interlocked at 28 with a spider 29 journalled on the inner end of the output shaft and provided with radial fingers 30, each of which engages the short inner arm of a weighted lever 31, each of which is pivoted on a pin 32 carried by clutch casing 33 in such manner that forward rotation of the spider 29 resists centrifugal forces tending to swing said levers outwardly.

Interposed between clutch casing 33 and carrier 20 is a clutch C comprising interdigitated friction rings 35, pressure ring 36, and abutment springs 37 of usual and well known construction. Each lever 31 carries a toggle T interposed between casing 33 and ring 36 in such manner that outward swing of lever 31 causes the toggle to move the pressure ring 36 to clamping position relative to the friction rings 35.

The output shaft 26 is provided with a flange 40 to which clutch casing 33 is connected by rivets 41. The main bodies of flange 40 and casing 33 are axially separated to permit the interposition of one or more planetary gears 42 each journalled on a pin 43 extending between flange 40 and casing 33. Gears 42 mesh with a gear 44, carried by carrier 20 coaxial with the sun gears, and gears 42 also mesh with an orbit gear 45 carried by a drum 46 journalled upon the output shaft 26 and within the housing 47. A manually controllable brake band 48 is associated with drum 46 in such manner that the drum may be selectively held against rotation.

Splined upon sleeve 18 is a drum 50 with which is associated a manually controllable brake band 51. Journalled on bearings 52 on the sleeve hub of drum 50 is a drum 53 with which is associated a manually controllable brake band 54, and interposed between drum 53 and carrier 20 is a one-way clutch 55 which serves to hold carrier 20 against reverse rotation when drum 53 is held stationary, but permits forward rotation of the carrier.

Interposed between shaft 14 and runner 12 is a one-way clutch 56 by which forward rotation may be imparted to shaft 14 by runner 12, but which permits forward rotation of shaft 14 relative to runner 12.

Runner 13 is splined to sleeve shaft 16.

Gear 15 is smaller than gear 17; gear 17 is smaller than gear 19; gears 15 and 17 are smaller than gear 25; and gear 25 is smaller than gear 19. Gears 24, 21, 22 and 23 are appropriately dimensioned to simultaneously mesh, respectively, with gears 25, 15, 17, and 19.

OPERATION

First speed forward

Drum 50 is held against rotation and brake 54 is released from drum 53, so that gear 19 is held against rotation and carrier 20 is free for reverse rotation. Brake 48 is released from drum 46. Impeller 11 being rotated, the flow of power is through 12, 56, 14, 15, and 21 to gear 24, which, because gear 19 is stationary and carrier 20 is free to rotate reversely, rolls around gear 19. At the same time gear 24 is being rotated about its own axis, as well as revolved about the axis of shaft 14. Revolution of gear 24 produces reverse rotation of gear 25, but, because of the radius differentials of the pairs 23—19 and 24—25, there is a resultant forward rotation of gear 25, which, acting on spider 29 and thence through fingers 30, pins 32, and flange 40, imparts low speed forward rotation to the output shaft 26.

Second speed forward

Forward rotation of runner 12 exerts a forward drag on runner 13, and, in course of time, as the differential between input torque and output torque decreases, runner 13 imparts a driving force to sleeve shaft 16 so that the flow of power is thence through 17, 22, 23 (rolling on 19), 24, 25, and thence to the output shaft, as described above, to produce second speed forward.

Third speed forward

When the differential between input torque and output torque is sufficiently decreased, the operator releases drum 50 and brings brake 54 into engagement with drum 53 so as to prevent reverse rotation of carrier 20. Thereupon the flow of power is through 12, 56, 14, 15, 21, 24, 25, 29 and thence to the output shaft as described above to produce third speed forward.

Fourth speed forward

As the differential between input and output torque further decreases the flow of power will be through 13, 16, 17, 22, 24, 25 and thence to the output shaft as described above to produce fourth speed forward.

Fifth speed forward

As the differential between the input and output torque further decreases, the centrifugal forces acting on levers 31 become sufficient to overcome the resistance offered by spider 29 so that they move outwardly to cause toggles T to activate clutch C so that carrier 20 is clutched directly to the output shaft and the flow of power is from runners 12 and 13 through the locked epicyclic gearing as a unit, to the output shaft.

Whenever the parts are in high speed condition and the differential between input torque and load torque sufficiently increases, levers 34 will be automatically returned to their inner positions due to the forces exerted thereon by spider 29 and fourth speed power will be automatically reestablished. Further increase of differential between input torque and output torque will automatically shift the flow of power away from runner 13 back to runner 12 so that the third speed power flow will be automatically established without any manual manipulation by the operator. Further increase of differential between input torque and output torque tending to stall the motor makes it necessary for the operator to release brake 54 and return brake 51 into engagement with drum 50 so that the necessary relationship for first or second speeds is reestablished, the shift from one to the other in either direction being entirely automatic in accordance with variations in the differential between input torque and output torque.

Whenever runner 13 is able to exert a driving force on gear 22, shaft 14 is rotated at a higher speed, but this is permitted by reason of the one-way clutch 56 which is interposed between said shaft and runner 12.

Reverse operation

Drum 50 is held so as to hold gear 19 against rotation, brake 54 is released from drum 53 and brake 48 is set upon drum 46 to hold gear 45. The initial flow of power is then from runner 12 through 56, 14, 15, and 21 to roll gear 23, reversely around gear 19 to reversely rotate carrier 20 and gear 44 thereby causing gear 42 to roll reversely within gear 45 and thus, through flange 40, rotating the output shaft 26 reversely. During this operation the action of gear 24 through gear 25, spider 29 and arms 30 on levers 31, prevents said levers from swinging outwardly and thus keeps clutch C in inactive condition. Upon sufficient decrease of the differential between input and load torque, runner 13 assumes the load so that the power flow is from 13 through 16 and 17 to 22 and thence rolling gear 23 reversely around gear 19 carrying with it reversely carrier 20 and gear 44 to roll gear 42 reversely within gear 45 and carry with it reversely flange 40 and the output shaft 26.

I claim as my invention:

1. A speed change gearing comprising a first sun gear, means for rotating said gear, a second larger sun gear coaxial with the first gear, means for rotating said second gear, a third gear larger than said sun gears and coaxial therewith, an output shaft coaxial with said gears, a driving connection between the third gear and the output shaft, a fourth gear coaxial with and larger than said three gears, means by which said fourth gear may be selectively held against rotation, a planetary gear unit comprising four portions simultaneously meshing respectively with said four coaxial gears, a carrier for said planetary gear unit coaxial with said four gears, means for selectively blocking or permitting reverse rotation of said carrier but permitting foward rotation thereof, a gear carried by said carrier and coaxial therewith, a planetary gear carried by the output shaft and meshing with said coaxial gear carried by the carrier, an orbit gear meshing with said last-mentioned planetary gear, means by which said orbit gear may be selectively held against rotation or released, and means for selectively coupling the third gear and the carrier of the unit planetary gear for unit rotation about the axis of the sun gears.

2. A speed change gearing comprising a first sun gear, means for rotating said gear, a second sun gear, means for rotating said second gear, a third gear coaxial with said sun gears, an output shaft coaxial with said gears, a driving connection between said third gear and output shaft, a fourth gear coaxial with said three gears and larger than the third gear, means by which said fourth gear may be selectively held against rotation, a planetary gear unit comprising four portions simultaneously meshing respectively with said four coaxial gears, a carrier for said planetary gear unit coaxial with said four gears, means for selectively blocking or permitting reverse rotation of said carrier but permitting forward rotation thereof, a gear carried by said carrier and coaxial therewith, a planetary gear carried by the output shaft and meshing with said coaxial gear carried by the carrier, an orbit gear meshing with said last-mentioned planetary gear, means by which said orbit gear may be selectively held against rotation or released, and means for selectively coupling the third gear and the carrier of the unit planetary gear for unit rotation about the axis of the sun gears.

3. A speed change gearing comprising a first sun gear, a second sun gear coaxial with the first gear, a third gear larger than said sun gears and coaxial therewith, an output shaft coaxial with said gears, a driving connection between the third gear and the output shaft, a fourth gear coaxial with and larger than said three gears, means by which said fourth gear may be selectively held against rotation, a planetary gear unit comprising four portions simultaneously meshing respectively with said four coaxial gears, a carrier for said planetary gear unit coaxial with said four gears, means for selectively blocking or permitting reverse rotation of said carrier but permitting forward rotation thereof, a gear carried by said carrier coaxial therewith, a planetary gear carried by the output shaft and meshing with said coaxial gear carried by the carrier, an orbit gear meshing with said last-mentioned planetary gear, means by which said orbit gear may be selectively held against rotation or released, means for selectively coupling the third gear and the carrier of the unit planetary gear for unit rotation about the axes of the sun gears, and a fluid-coupling input assembly comprising an impeller, a first runner connected to the first gear by a one-way forwarding clutch, and a second runner connected with the second sun gear.

4. A speed change gearing comprising a first sun gear, a second sun gear coaxial with the first gear, a third gear coaxial therewith, an output shaft coaxial with said gears, a driving connection between the third gear and the output shaft, a fourth gear coaxial with and larger than said third gear, means by which said fourth gear may be selectively held against rotation, a planetary gear unit comprising four portions simultaneously meshing respectively with said four coaxial gears, a carrier for said planetary gear unit coaxial with said four gears, means for selectively blocking or permitting forward rotation thereof, a gear carried by said carrier coaxial therewith, a planetary gear carried by the output shaft and meshing with said coaxial gear carried by the carrier, an orbit gear meshing with said last-mentioned planetary gear, means by which said orbit gear may be selectively held against rotation or released, means for selectively coupling the third gear and the carrier of the unit planetary gear for unit rotation about the axes of the sun gears, and a fluid-coupling input assembly comprising an impeller, a first runner connected to the first gear by a one-way forwarding clutch, and a second runner connected with the second sun gear.

5. Apparatus of the character specified in claim 2, wherein the driving connection between the third gear and the output shaft comprises a clutch interposed between the output shaft and the carrier of the unit planetary gear, a speed-sensitive actuator for said clutch and a resistor for said actuator sensitive to the difference between input torque applied by the sun gears and load torque applied to the output shaft.

6. Apparatus of the character specified in claim 4, wherein the driving connection between the third gear and the output shaft comprises a clutch interposed between the output shaft and the carrier of the unit planetary gear, a speed-sensitive actuator for said clutch and a resistor for said actuator sensitive to the difference between input torque applied by the sun gears and load torque applied to the output shaft.

7. Apparatus of the character specified in claim 2, wherein the driving connection between the third gear and the output shaft comprises a clutch interposed between the output shaft and the carrier of the unit planetary gear, a planetary speed-sensitive lever pivoted eccentrically on the output shaft and a connection between the third gear and said lever whereby forward torque on said third gear opposes centrifugal forces acting on said lever.

8. Apparatus of the character specified in claim 4, wherein the driving connection between the third gear and the output shaft comprises a clutch interposed between the output shaft and the carrier of the unit planetary gear, a planetary speed-sensitive lever pivoted eccentrically on the output shaft and a connection between the third gear and said lever whereby forward torque on said third gear opposes centrifugal forces acting on said lever.

WILLIAM A. DUFFIELD.